(12) United States Patent
Beck et al.

(10) Patent No.: US 9,707,577 B2
(45) Date of Patent: Jul. 18, 2017

(54) FILAMENT EXTENSION ATOMIZERS

(71) Applicant: Palo Alto Research Center Incorporated, Palo Alto, CA (US)

(72) Inventors: Victor Alfred Beck, Menlo Park, CA (US); David Mathew Johnson, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 41 days.

(21) Appl. No.: 14/812,505

(22) Filed: Jul. 29, 2015

(65) Prior Publication Data

US 2017/0028414 A1    Feb. 2, 2017

(51) Int. Cl.
*B05B 15/04*   (2006.01)
*B05B 3/08*    (2006.01)
(Continued)

(52) U.S. Cl.
CPC ............ *B05B 3/08* (2013.01); *B01F 3/04028* (2013.01); *B01J 13/0095* (2013.01); *B05B 1/28* (2013.01); *B05B 7/0075* (2013.01); *B05B 17/04* (2013.01)

(58) Field of Classification Search
CPC .. B05B 3/08; B05B 17/04; B05B 1/28; B05B 7/0075; B05B 15/04; B05B 3/02; B05B 13/0207; B05B 5/04; B01F 3/04028; B01J 13/0095; B05D 1/02; B41J 2/0057; D06B 1/02; G03G 2215/00801; B41F 7/30; B41F 7/28; B41F 7/26
(Continued)

(56) References Cited

U.S. PATENT DOCUMENTS 2,291,046 A    7/1942   Lange
3,554,815 A    1/1971   Otto
(Continued)

FOREIGN PATENT DOCUMENTS

EP    2227834    8/2011

OTHER PUBLICATIONS

Sholin, V. et al.: "High Work Function Materials for Source/Drain Contacts in Printed Polymer Thin Transistors," Applied Physics Letters, vol. 92, 2008.
(Continued)

*Primary Examiner* — Arthur O Hall
*Assistant Examiner* — Juan C Barrera
(74) *Attorney, Agent, or Firm* — Marger Johnson

(57) ABSTRACT

An atomization device includes a pair of counter-rotating rollers, a fluid source configured to coat at least one of the rollers in a feed fluid, and a baffle unit. The counter-rotation of the rollers stretches the feed fluid into a fluid filament between the two diverging surfaces of the rollers. The stretched fluid filaments break into a plurality of droplets at a capillary break-up point of the feed fluid. The baffle unit introduces a baffle fluid within the interior of the device and the baffle fluid transports formed droplets of the feed fluid from the atomization device. Excess or misguided atomized fluid droplets are collected by the baffle unit and are recycled back into the device for use in later atomization processes. The variation of atomization device parameters allows for the selection of droplets having desired physical parameters.

23 Claims, 12 Drawing Sheets

(51) Int. Cl.
| | | |
|---|---|---|
| B01J 13/00 | (2006.01) | |
| B05B 1/28 | (2006.01) | |
| B05B 7/00 | (2006.01) | |
| B05B 17/04 | (2006.01) | |
| B01F 3/04 | (2006.01) | |

(58) Field of Classification Search
USPC ...... 239/214, 220, 222, 222.11, 222.13, 122, 239/219; 101/148, 487; 118/DIG. 16, 118/300, 244, 258, DIG. 15; 427/421.1, 427/425; 106/31.13; 159/11.1, 4.07, 4.3; 222/281; 347/100, 47; 492/47
See application file for complete search history.

(56) References Cited

U.S. PATENT DOCUMENTS

| | | | |
|---|---|---|---|
| 3,626,833 A | 12/1971 | Koch | |
| 3,649,829 A | 3/1972 | Randolph | |
| 3,702,258 A | 11/1972 | Gibbons et al. | |
| 3,717,875 A | 2/1973 | Arciprete et al. | |
| 3,873,025 A | 3/1975 | Qvarnstrom | |
| 3,926,114 A | 12/1975 | Matuschke | |
| 4,011,993 A * | 3/1977 | Mizuno | E01C 23/22 118/308 |
| 4,034,670 A * | 7/1977 | Zavodny | B41F 7/30 101/148 |
| 4,222,059 A | 9/1980 | Crean et al. | |
| 4,384,296 A | 5/1983 | Torpey | |
| 5,216,952 A * | 6/1993 | Hoff | B41F 7/28 101/147 |
| 5,270,086 A | 12/1993 | Hamlin | |
| 5,314,119 A * | 5/1994 | Watt | B05B 3/08 101/363 |
| 5,328,509 A * | 7/1994 | Essex | A21C 9/04 118/24 |
| 6,125,756 A * | 10/2000 | Nussel | B41C 1/1058 101/453 |
| 6,382,524 B1 | 5/2002 | James | |
| 6,576,861 B2 | 6/2003 | Sampath et al. | |
| 6,622,335 B1 | 9/2003 | Anderson et al. | |
| 6,934,142 B2 | 8/2005 | Grosse et al. | |
| 7,083,830 B2 | 8/2006 | Minko | |
| RE40,722 E * | 6/2009 | Chappa | B05B 7/0807 118/300 |
| 8,132,744 B2 | 3/2012 | King et al. | |
| 8,272,579 B2 | 9/2012 | King et al. | |
| 8,273,286 B2 * | 9/2012 | Fram | B29B 15/122 156/500 |
| 8,511,251 B2 | 8/2013 | Sato | |
| 8,523,340 B2 * | 9/2013 | Sabo | B41J 2/0057 347/12 |
| 8,552,299 B2 | 10/2013 | Rogers et al. | |
| 8,720,370 B2 | 5/2014 | Rebstock | |
| 8,742,246 B2 | 6/2014 | Toyoda et al. | |
| 9,021,948 B2 | 5/2015 | Pattekar | |
| 2002/0053320 A1 | 5/2002 | Duthaler et al. | |
| 2005/0000231 A1 | 1/2005 | Lee | |
| 2005/0250900 A1* | 11/2005 | Stofko | B05B 3/02 524/594 |
| 2006/0035033 A1 | 2/2006 | Tanahashi et al. | |
| 2009/0014046 A1 | 1/2009 | Yu et al. | |
| 2010/0154856 A1 | 6/2010 | Hiroyama et al. | |
| 2011/0017431 A1 | 1/2011 | Yang et al. | |
| 2011/0150036 A1 | 6/2011 | Lee et al. | |
| 2011/0154558 A1 | 6/2011 | Peter et al. | |
| 2011/0220147 A1* | 9/2011 | Schreiber | B08B 1/02 134/15 |
| 2012/0038726 A1* | 2/2012 | Pattekar | B41J 2/0057 347/103 |
| 2012/0227778 A1 | 9/2012 | Leonov | |
| 2013/0087180 A1 | 4/2013 | Stark et al. | |
| 2014/0146116 A1 | 5/2014 | Paschkewitz | |

OTHER PUBLICATIONS

Zhou, Li, et al: "Highly Conductive, Flexible, Polyurethane-Based Adhesives for Flexible and Printed Electronics," Advanced Functional Materials, vol. 23, p. 1459-1465, wileyonlinelibrary.com.
McClure, Max, "Stanford Researchers' Cooling Glove Better than Steroids—and Helps Solve Physiological Mystery Too", Stanford Report, Aug. 29, 2012, 3 pages, retrieved from the Internet: http://news.stanford.edu/news/2012/august/cooling-glove-research-082912.html, retrieved on Dec. 19, 2014.
Matheson, Rob, "Cool Invention Wins First Place at MADMEC", MIT News Office, Oct. 17, 2013, 3 pages, retrieved from the Internet: http://newsoffice.mit.edu/2013/madmec-design-competition-1017, retrieved on Dec. 19, 2014.
Vanhemert, Kyle, "MIT Wristband Could Make AC Obsolete", Wired.com, Oct. 30, 2013, retrieved from the Internet: http://www.wired.com/2013/10/an-ingenious-wristband-that-keeps-your-body-at-theperfect-temperature-no-ac-required/, retrieved on Dec. 19, 2014.
Francioso, L., "Flexible thermoelectric generator for ambient assisted living wearable biometric sensors", Journal of Power Sources, vol. 196, Issue 6, Mar. 15, 2011, pp. 3239-3243.
http://www.stacoolvest.com/, retrieved on Dec. 19, 2014.
http://www.steelevest.com/, retrieved on Dec. 19, 2014.
http://www.veskimo.com/, retrieved on Dec. 19, 2014.
http://www.glaciertek.com/, retrieved on Dec. 19, 2014.
http://www.cvs.com/shop/product-detail/CVS-Cold-Pain-Relief-Pack-Reusable?skuld=324111, retrieved on Dec. 19, 2014.
Chen, A.,"Dispenser-printed planar thick-film thermoelectric energy generators," J. Micromech. Microeng., 21(10), 2011.
Hewitt, A.B., "Multilayered Carbon Nanotube/Polymer Composite Based Thermoelectric Fabrics," Nano Letters, 12 (3), pp. 1307-1310, 2012.
Arens, E., "Partial- and whole-body thermal sensation and comfort—Part I: Uniform environmental conditions," Journal of Thermal Biology, vol. 31, Issues 1-2, Jan. 2006, pp. 53-59.
Arens, E., "Partial- and whole-body thermal sensation and comfort—Part II: Non-uniform environmental conditions," Journal of Thermal Biology, vol. 31, Issues 1-2, Jan. 2006, pp. 60-66.
Bullis, Kevin, "Expandable Silicon", MIT Technology Review, Dec. 14, 2007, URL: http://www.technologyreview.com/news/409198/expandable-silicon/, retrieved from the Internet on Dec. 23, 2014.
"Ortho-Planar Spring", BYI Mechanical Engineering Website, URL: http://compliantmechanisms.byu.edu/content/ortho-planar-spring, retrieved from the Internet on Dec. 23, 2014.
S.-J. Kim, J.-H. Wea and B.-J. Cho: "A wearable thermoelectric generator fabricated on a glass fabric," Energy Environmental Science, 2014.
L. Francioso, C. De Pascali, A. Taurino, P. Siciliano, A. De Risi: "Wearable and flexible thermoelectric generator with enhanced package," In Proc. SPIE 8763, Smart Sensors, Actuators, and MEMS VI, 876306, May 2013.
C. Huizenga, H. Zhang, E. Arens, D. Wang: "Skin and core temperature response to partial-and whole-body heating and cooling," Journal of Thermal Biology, vol. 29, Issues 7-8, Oct.-Dec. 2004, pp. 549-558.
Bhat, Pradeep P., "Formation of beads-on-a-string structures during break-up of viscoelastic filaments," Aug. 2010, vol. 6:625-631, Nature Physics, 7 pages.
Le, Hue P., "Progress and Trends in Ink-jet Printing Technology," Jan./Feb. 1998, vol. 42:49-62, Journal of Imaging Science and Technology, 16 pages, found at: http://www.imaging.org/ist/resources/tutorials/inkjet.cfm.
Oliveira, Monica S., "Iterated Stretching, Extensional Rheology and Formation of Beads-on-a-String Structures in Polymer Solutions," Jan. 20, 2006, Special Issue of JNNFM on Extensional Flow, MIT, Cambridge, MA, 36 pages.
Owen, M., "Misting of non-Newtonian Liquids in Forward Roll Coating," Jul. 13, 2011, Journal of Non-Newtonian Fluid Mechanics, vol. 166:1123-1128, 6 pages.

(56) References Cited

OTHER PUBLICATIONS

Shi, X.D., "A Cascade of Structure in a Drop Falling from a Faucet," Jul. 8, 2004, vol. 265:219-222, Science, 4 pages.
Chapter 15, "Ink Jet Printing", 14 pages, found at http://www.lintech.org/comp-per/15INK.pdf.
Marple, A. And Liu, Y.H.: "Characteristics of Laminar Jet Impactors", Environmental Science & Technology, vol. 8, No. 7, Jul. 1974, pp. 648-654.
Bailey, Adrian G.: "The Science and technology of electrostatic powder spraying, transport and coating", Journal of Electrostatics, vol. 45, 1998, pp. 85-120.
Domnick, et al.: "The Simulation of Electrostatic Spray Painting Process with High-Speed Rotary Bell Atomizers. Part II: External Charging", Part. Part. Syst. Charact. vol. 23, 2006, pp. 408-416, URL: http://www.ppsc-journal.com.
Kelly, Ryan T, et al..: "The ion funnel: theory, implementations, and applications", Mass Spectrometry Reviews, vol. 29, 2010, pp. 294-312.
Crowe, Clayton et al.: "Multiphase Flows With Droplets and Particles", CRC Press, LLC, 1998.
Non-Final Office Action for U.S. Appl. No. 14/066,435, dated Jan. 21, 2016, 29 pages.

* cited by examiner

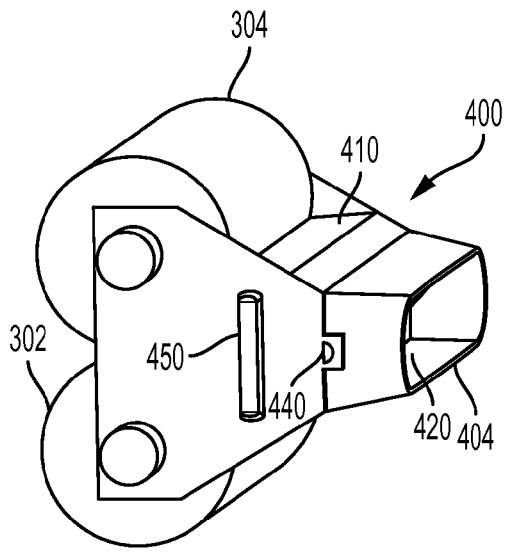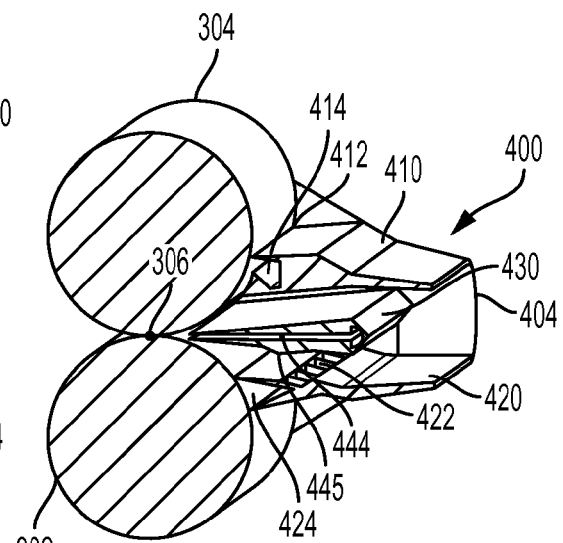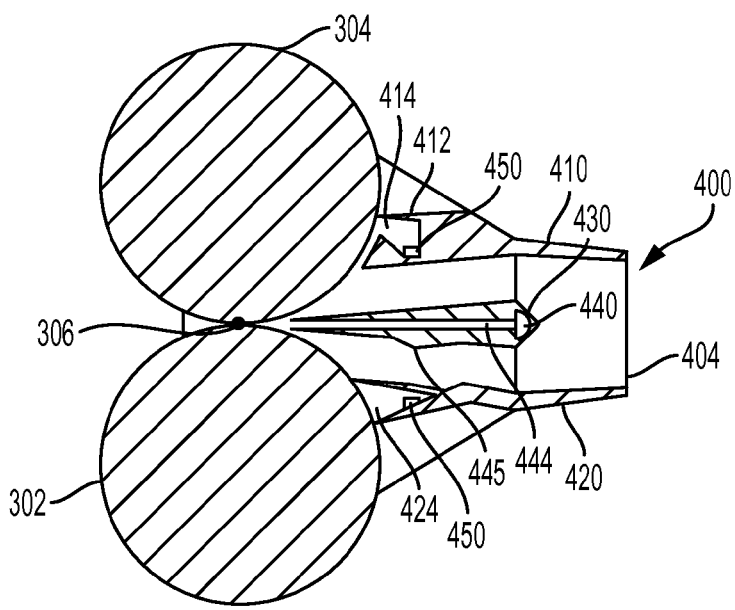

ntracted to U.S. patent application Ser.

FILAMENT EXTENSION ATOMIZERS

RELATED APPLICATION DATA

This application is related to U.S. patent application Ser. No. 14/812,608, titled "FILAMENT EXTENSION ATOMIZERS".

BACKGROUND

Many conventional spray deposition systems use highly pressurized air to help generate droplets of highly viscous fluids or fluids that have non-Newtonian properties. For example, some conventional systems use nozzle spraying, air-blast atomization techniques, and rotary atomization to create droplets although even these systems tend to have difficulties in creating the droplets and, more specifically, in creating droplets of a desired size, distribution and quantity.

Some mechanical spray deposition systems are able to atomize highly viscous and/or non-Newtonian fluids by using diverging surfaces, such as a pair of diverging pistons and/or a pair of counter-rotating rollers. These systems stretch fluid between the diverging surfaces until fluid filaments form. The applied strain or continuous stretching to the fluid filaments causes them to stretch until beyond the point at which the fluid filaments break up from capillary forces, meaning the fluid filaments exceed their capillary break-up point and break into droplets. The diverging surface-type spray deposition systems generally produce large volumes of spray droplets.

Typical with most spray depositions systems is the problem of overspray. Droplets are spread in many directions by the spray depositions systems. While many of the droplets are focused onto a desired substrate, some quantity of the spray deposits onto unintended surfaces. These surfaces can include the surrounding environment about the spray deposition system, including delicate control and electrical systems. Additionally, overspray reduces the efficiency of the spray deposition as any overspray is lost fluid that is not used for a desired or intended purpose.

In some situations, the atomized fluid may require heating or other treatment before being sprayed. These treatments can adversely affect the environment surrounding the spray deposition system, such as inducing undue heat stress on surrounding components. To protect the system components, oftentimes the conventional spray deposition systems simply cannot include elements that treat the fluid, like heating it, before the fluid is broken into droplets and sprayed.

Therefore, the spray deposition art would greatly benefit from systems and methods that can create of a quantity of droplets having a controlled size, distribution, or volume, that are directed in an intended direction to minimize overspray and have a controlled, isolated environment in which to manage and treat the fluid for atomization.

SUMMARY

According to aspects illustrated herein, there is provided an apparatus for atomizing a feed fluid. The atomization device includes a pair of rotating rollers that are positioned adjacent to each other and having a nip defined therebetween, the nip having an upstream side and a downstream side. A fluid source coats at least one of the rollers with the feed fluid. The rotation of the pair of rollers stretches the feed fluid on the downstream side of the nip. A baffle unit is included in the atomization device. The baffle unit has a pair of exterior baffles and an interior baffle disposed between the pair of exterior baffles. The baffle unit is positioned within the atomization device such that the interior baffle directs a baffle fluid from the interior baffle towards the downstream side of the nip. The stretched feed fluid forming droplets that are carried with the baffle fluid from the atomization device.

Also provided is an apparatus including a pair of diverging surfaces between which the feed fluid is stretched. A baffle unit directs a baffle fluid towards the downstream side of the stretched feed fluid. The stretched feed fluid forming droplets that are carried with the baffle fluid from the apparatus.

A further method of atomizing a fluid is also provided. The method includes drawing an atomization fluid from a fluid source through the nip of a pair of rotating rollers, stretching the fluid between the diverging surfaces of the rollers to form a fluid filament. A baffle fluid is expelled from the interior baffle of a baffle unit, the expelled baffle fluid directed towards the downstream side of the nip. The fluid filament atomizing into a plurality of atomized fluid droplets. The atomized fluid droplets are suspended within the expelled baffle fluid.

BRIEF DESCRIPTION OF THE DRAWINGS

FIG. 6 is another example baffle of the atomization device in a horizontal orientation.

FIG. 7 is a perspective view of a cross section of the baffle of FIG. 6.

FIG. 8 is a cross section of the baffle of FIG. 6.

DETAILED DESCRIPTION

Figure 1:
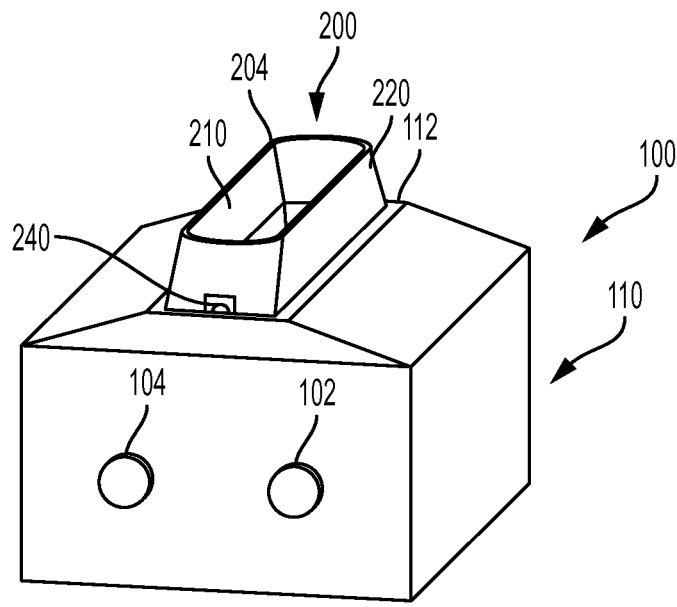
FIG. 1 is a perspective view of an embodiment of an example atomization device.

The disclosed filament extension atomization systems and methods can form a quantity of droplets having a controlled size, distribution, and/or volume, from highly-viscous fluids and/or fluids having non-Newtonian properties in a mechanical system or any other fluids. The mechanical nature of the disclosed systems and methods simplifies the process of creating the droplets and helps control the droplets after they are formed. Also, by using a mechanical system, the droplet size can be controlled, which leads to broadening the applications that can use fluid atomizers.

The stretching of the fluid forms fluid filaments and when the stretched fluid filaments exceed their capillary break-up points, they break into a controlled-volume of droplets. The "capillary break-up point" for a fluid is the point at which a stretched filament breaks up from capillary forces. Excess fluid from the broken fluid filaments retracts back onto one or both of the fluid feed system and the surface.

For example, a fluid can be stretched using fluid extension atomization techniques, such as stretching fluid between two diverging surfaces. The stretching of the fluid forms fluid filaments and when the stretched fluid filaments exceed their capillary break-up points, they break into a controlled-volume of droplets. Excess fluid from the broken fluid filaments retracts back onto one or both of the fluid feed system and the surface.

Such fluid extension atomization techniques generally are capable of atomizing fluids that are highly viscous and/or fluids that have non-Newtonian properties or other complex rheologies by using purely mechanical means. Some fluid extension atomizers may have additional, non-mechanical means that help to control or otherwise manipulate the fluid, the surfaces, or the harvesting of the formed droplets. In the example fluid extension atomizers with diverging surfaces, the surfaces can be one or more rotating rollers, one or more pistons, one or more flat surfaces or blocks, or any other shaped, textured, or contoured surface, or any combination thereof. The fluid extension atomizers can also have multiple, parallel fluid extension atomizers that individually stretch a controlled volume of the fluid, and together generate a collective volume of a controlled amount of the fluid.

FIGS. 1 and 2 illustrate an example embodiment of an atomization device 100. The atomization device 100 stretches a fluid filament between two counter-rotating rollers 102 and 104. The stretching of the fluid filament between the rollers causing the fluid filament to break into a plurality of droplets or an aerosol at the "capillary break-up point" of the fluid. The atomization device 100 includes a housing 110 that encloses the droplet creation process and components. Rollers 102 and 104 are disposed within the housing 110, which includes an exit port 112 in which a baffle unit 200 can be disposed.

In the embodiment shown, the rollers 102 and 104 are cylindrical with a nip 106 defined between the two rollers 102 and 104. The nip 106 can be a distance the rollers are spaced apart or a roller spacing distance. The roller spacing distance can be measured as the distance from a surface of one roller to the surface of the opposite roller. However, the rollers can also be touching resulting in a zero roller spacing distance. In other embodiments, the roller spacing distance can also be a negative value, such as what can occur when the rollers have a compressible surface that allows the circumference of each of the rollers to intersect and overlap.

The nip 106 has a downstream side and an upstream side. The downstream side of the nip 106 is defined as the direction in which the droplets are directed from the rollers, while the upstream side of the nip is defined as the opposite direction. In the embodiment shown, the downstream side of the nip 106 is directed through the baffle 200 and the upstream side is directed towards the base of the housing 110.

To atomize a fluid the, rollers 102 and 104 counter-rotate and draw a fluid from the upstream side of the nip 106 to a downstream side. The fluid forms a filament spanning between the two rollers 102 and 104 on the downstream side of the nip 106. As the rollers 102 and 104 continue to rotate, the fluid filament remains attached to each of the rollers. The fluid filament adheres to each of the rollers 102 and 104 in a substantially constant position on the surface of each of the rollers. Due to the counter-rotating behavior of the rollers, the adhered positions move away from one another as the rollers counter-rotate. This causes the fluid filament to be further stretched between the two rollers, 102 and 104, increasing the strain on the fluid filament.

The fluid has an ultimate "capillary break-up point" at which the fluid filament breaks into droplets when the strain within the fluid filament exceeds this value. A portion of the fluid is atomized or forms droplets and another portion of the fluid remains adhered to the rollers 102 and 104. The breaking of the stretched fluid filament relieves the strain within the fluid and provides part of the kinetic energy to the droplets, effectively ejecting them in the downstream direction away from the nip 106. Additional kinetic energy is imparted to the droplets by the rotation of the rollers and the air movement in the vicinity of the rollers.

The various elements of the atomization device are enclosed in a housing 110, as shown in FIGS. 1 and 2. The housing 110 encloses the rollers 102 and 104, which are used to stretch the fluid and position the baffle unit 200 in-place. The housing 110 and the baffle unit 200 also encloses the atomized fluid, which helps to minimize fluid droplet overspray. The minimization of overspray assists in protecting the surrounding environment and users from contamination by the atomized fluid. This isolation can be especially critical when the feed fluid used is potentially hazardous. The isolative nature of the housing 110 and the minimization of overspray protects users and the environment from potentially adverse effects of feed fluid exposure.

The housing 110 can have insulative side walls in some examples. Insulative side walls can thermally isolate the interior of the housing 110 from the surrounding environment. The thermal isolation allows the fluid to be atomized or feed fluid to be maintained at a relatively constant and selected temperature independent from the surrounding environment and temperature. Additionally, the thermal isolation protects the surrounding environment from the internal temperature of the housing 110. In some embodiments, it may be desirable to have the feed fluid at a high temperature in order to achieve a desired consistency or viscosity for the atomization process. Absent the insulative housing 110, high feed fluid temperatures could increase the temperature of the surrounding environment. The increased surrounding environment temperature could damage or interfere with components outside of the atomization device 100, such as an atomization device 100 control system and sensors.

The isolation of the atomization device 100 from the surrounding environment protects both the device 100 and the environment from contamination, damage and or interference. Such isolation can allow for greater control over the output of the atomization device 100, allowing the device 100 to perform more efficiently and effectively.

In the embodiment shown in FIGS. 1 and 2, a baffle unit 200 is included in the atomization device 100. FIGS. 3-5 illustrate additional views of the baffle unit 200. The baffle unit 200 directs or channels the atomized or formed droplets away from the rollers and towards a selected direction. In the embodiment shown, the selected direction is the downstream side of the nip 106.

The baffle unit 200 includes an interior baffle 230 having a channel 234 that extends through the interior baffle 230 and is directed towards the nip 106 formed between the two rollers 102 and 104. The channel 234 directs a baffle fluid from a baffle fluid source towards the nip 106. The baffle fluid is supplied to the channel 234 through a baffle fluid inlet 240 that is in fluid communication with the baffle fluid source and the interior baffle channel 234. In directing the baffle fluid from the interior channel 234 towards the nip 106, the baffle fluid can increase and/or control the strain of the fluid filament. The strain of the fluid filament caused by the expelled or directed baffle fluid can add to the strain caused by the counter-rotation of the rollers 102 and 104.

The cumulative strain on the fluid filament can cause the fluid filament to atomize at a point earlier than if the induced strain was caused by roller-induced stretching of the fluid alone. This can allow a user to control the break-up of formed fluid filaments by varying the baffle fluid and the baffle fluid delivery parameters. Such parameters can include the amount of baffle fluid expelled, the speed of the expelled baffle fluid, the temperature of the baffle fluid and the pressure of the baffle fluid. Varying the parameters and/or properties of the baffle fluid can allow a user to achieve an optimal droplet size for an application.

The baffle fluid is a gaseous fluid, such as atmospheric air. The selection of the baffle fluid type can be based on the desired characteristics of the formed droplets, the properties of the baffle fluid and other parameters to achieve the desired droplets. It may be desirable to use a baffle fluid having a large temperature carrying capacity, the flow of the baffle fluid into the device 100 heating the interior of the device to assists with the rheological properties of the feed fluid.

The interior baffle 230 directs the expelled baffle fluid towards the nip 106. The expelled baffle fluid contacts the fluid filament and the rollers 102 and 104. The rotation of the rollers 102 and 104 redirects the expelled baffle fluid towards the exit port 112 and baffle outlet 204. The redirected baffle fluid flow assists with transporting the atomized fluid or fluid droplets out of the atomization device 100 in a selected direction.

The atomization device 100 is in a vertical orientation and directs the fluid droplets upwards through the baffle opening 204. The vertical orientation of the atomization device 100 assists in controlling various parameters of the expelled droplets. Expelling the atomized fluid vertically allows the benefit of gravity to assist with droplet selection. The expelled droplets have a mass and travel upward through the baffle 200 with a velocity. The velocity of an individual droplet includes a direction and speed that is imparted to the droplets during the fluid filament break-up process and the movement, or flow, of baffle fluid through the device. The force of gravity acts on the expelled droplets, the droplets that have more mass being correspondingly more affected, which slows the velocity of the droplet and potentially prevents a number of droplets from exiting the device 100 through the baffle opening 204.

By varying the height that the baffle 200 extends past the housing 110 of the device 100, combined with the imparted velocity of the droplets, droplet size or mass can be selected to have a controlled maximum. Droplets exceeding this maximum size or mass will have their movement through the baffle 200 slowed by gravity, which prevents the expulsion of such droplets through the baffle opening 204. Additionally, the assurance that droplets of at least a desired size are emitted from the atomization device 100 assists in preventing overspray. Selecting for droplets having pre-selected desired parameters ensures that the droplets are deposited properly and that there is a limited amount of excess or waste while further minimizing or preventing overspray.

Figure 2:
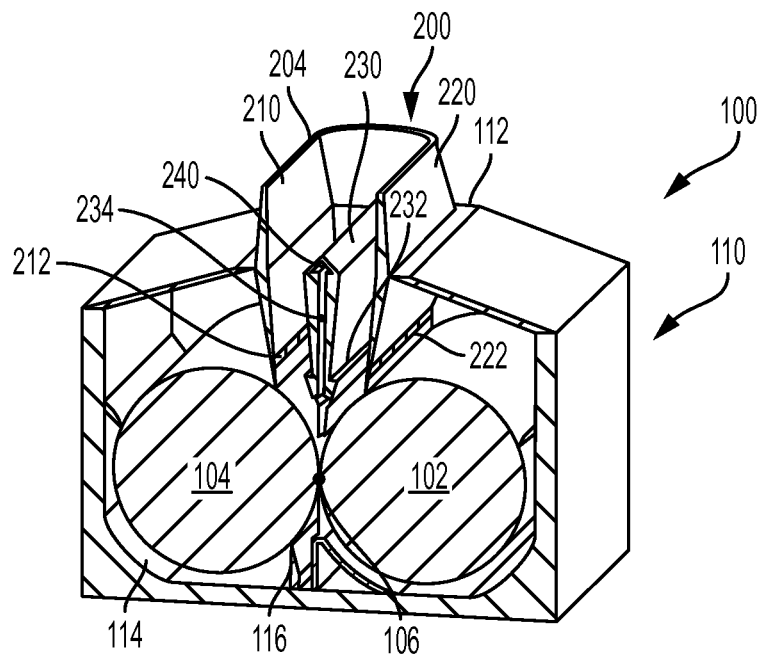
FIG. 2 is a cross section of the example atomization device of FIG. 1.
Figure 3:
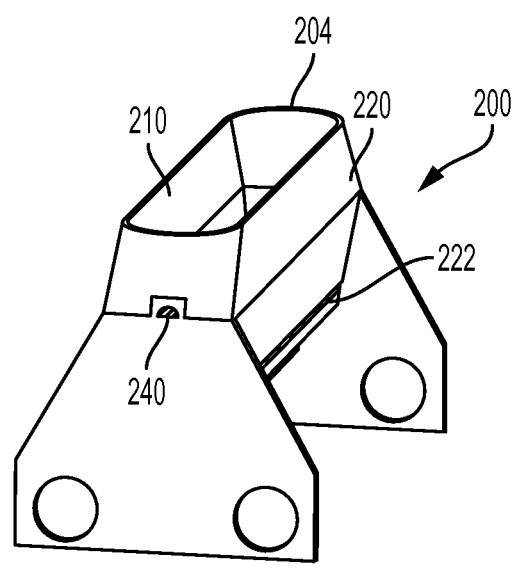
FIG. 3 is perspective view of an embodiment of the baffle unit of the atomization device of FIG. 1.
Figure 4:
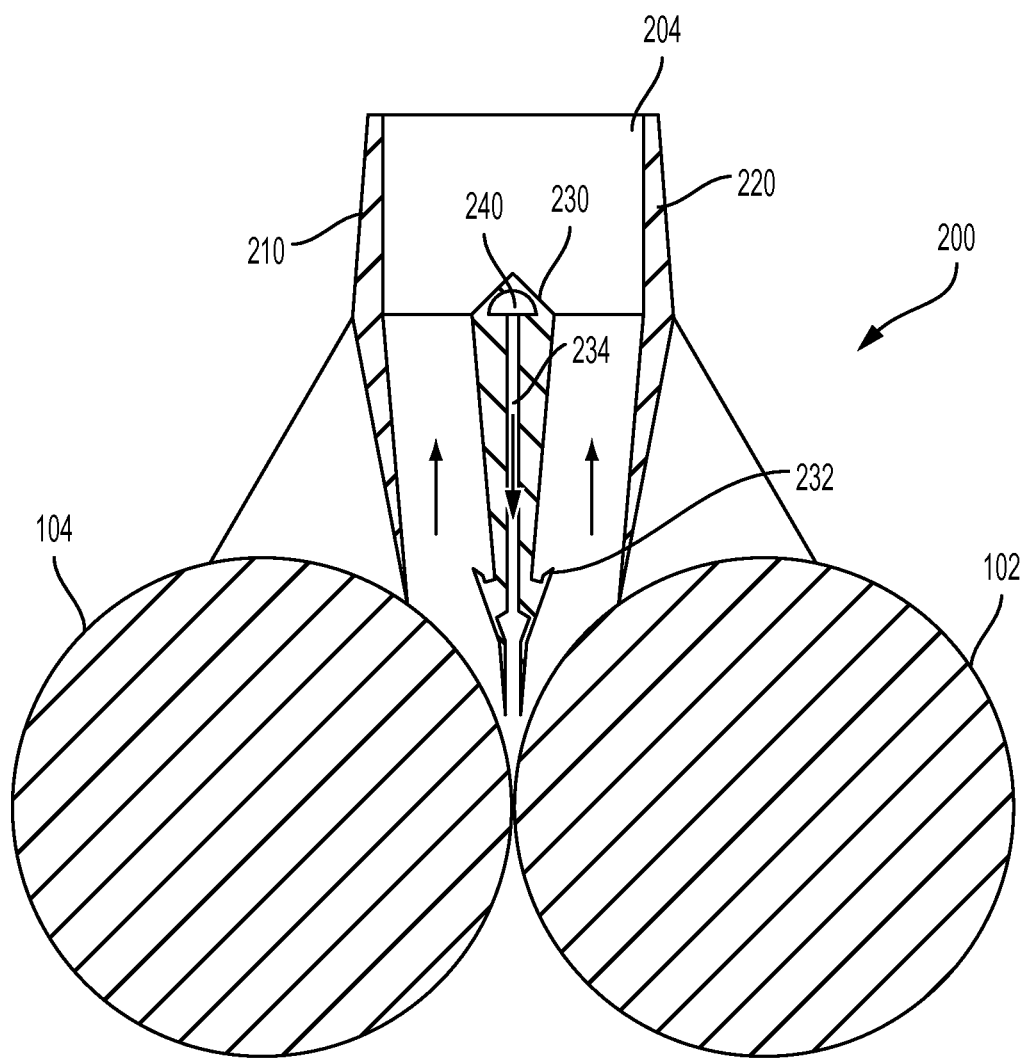
FIG. 4 is a cross section of the baffle unit of FIG. 3.
Figure 5:
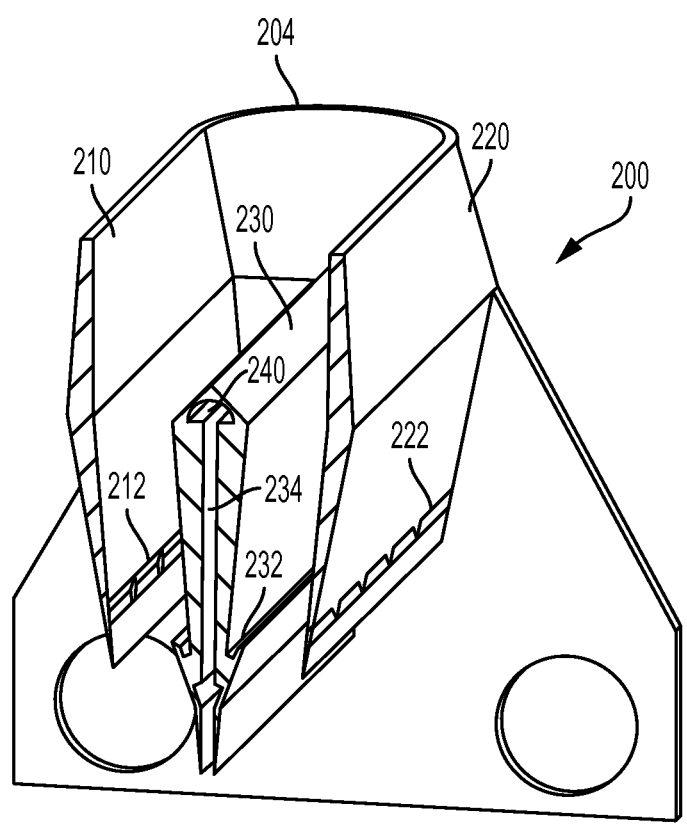
FIG. 5 is a perspective view of a cross section of the baffle of FIG. 3.
Figure 9:
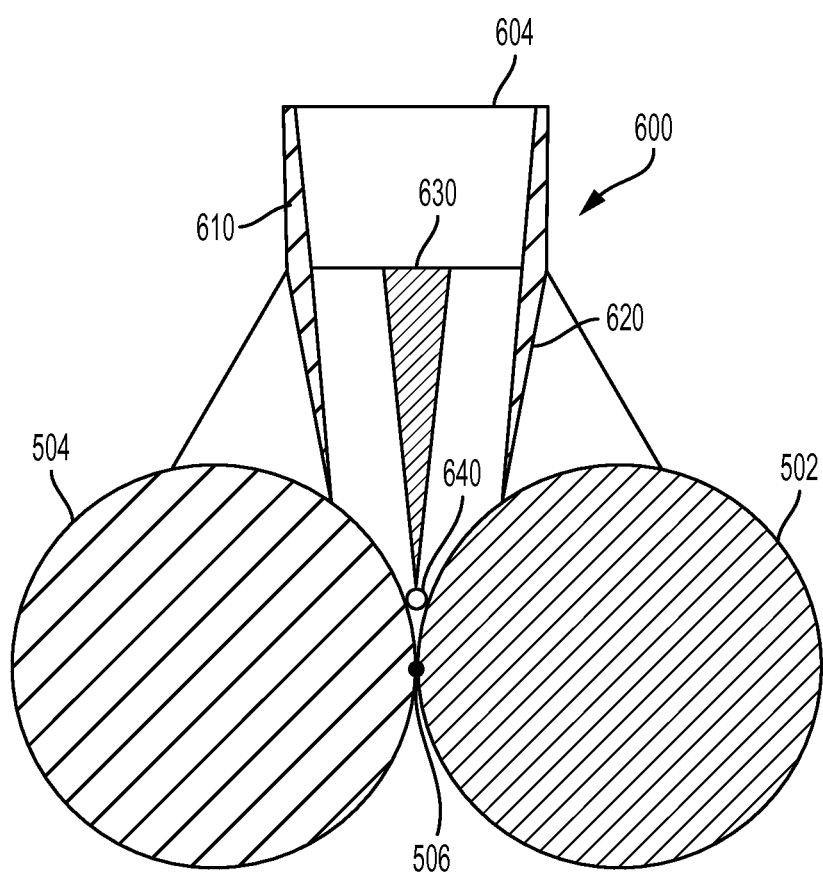
FIG. 9 is a cross section of another example baffle unit of the atomization device.
Figure 10:
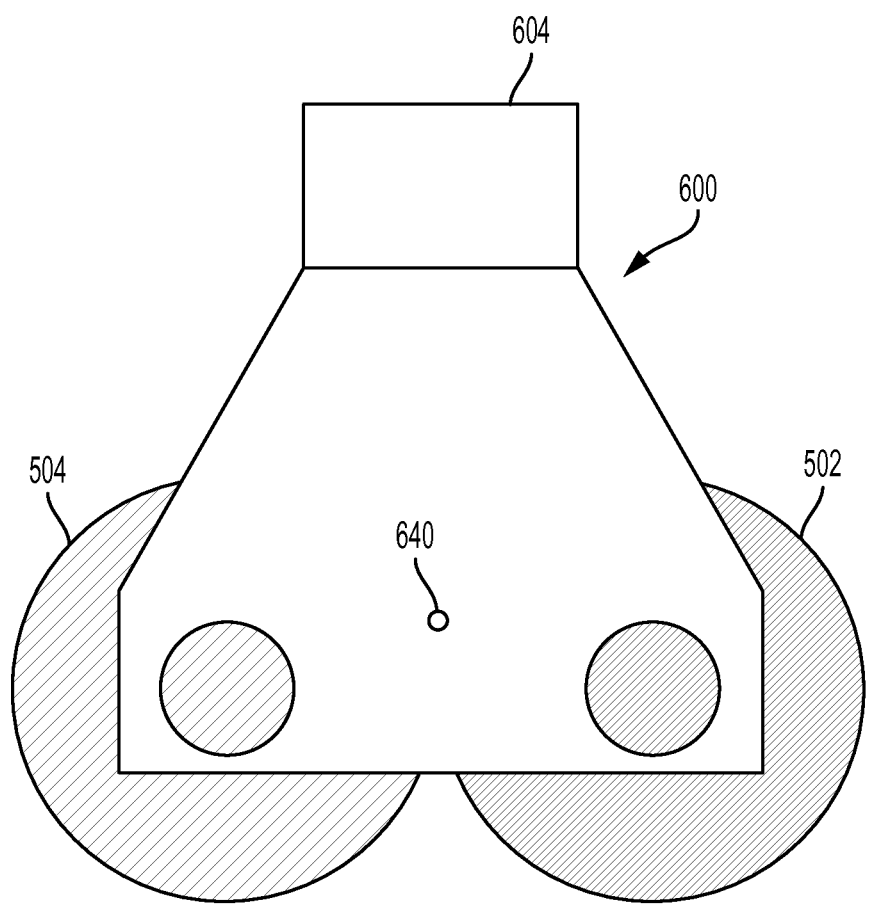
FIG. 10 is a side view of the example baffle unit of FIG. 9.
Figure 11:
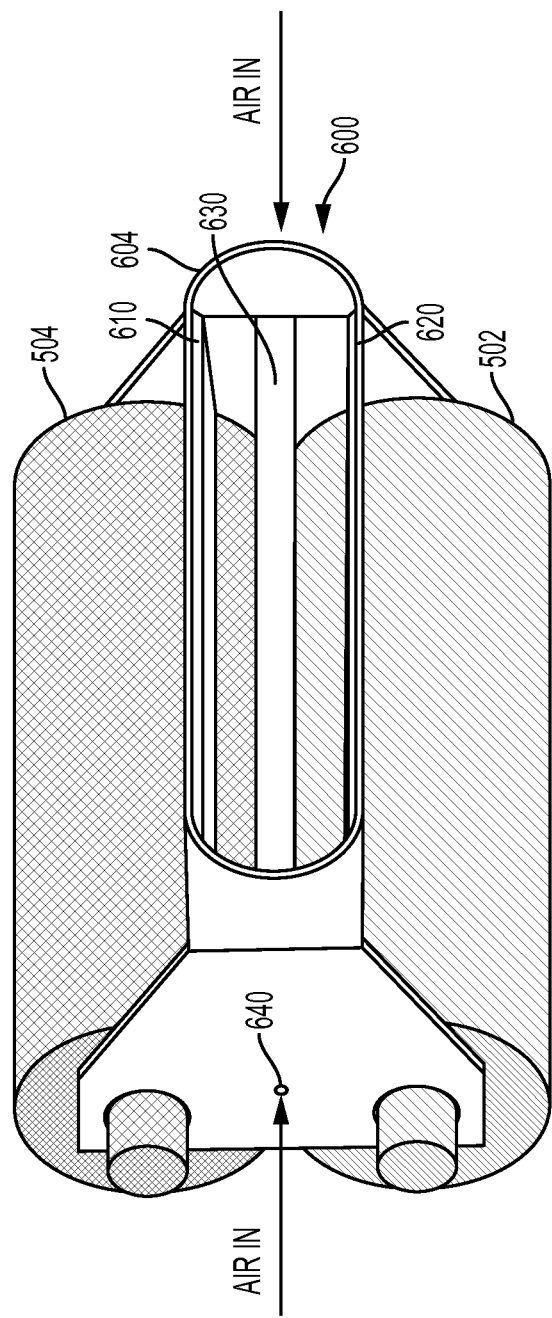
FIG. 11 is a perspective view of the example baffle unit of FIG. 9.

In the embodiment shown in FIGS. 1 and 2, the feed fluid is contained in a reservoir 114 within the housing 110. The roller 104 is rotated through the reservoir 114 to coat the rollers 104 with the feed fluid. A doctor blade 116 is positioned a distance from the surface of the roller 104 and removes excess feed fluid from the roller 104, which ensures that an even and desired thickness of feed fluid coats the roller 104. The fluid coating roller 104 contacts roller 102 and draws the fluid through the nip 106 in preparation for stretching between the diverging roller surfaces. As the fluid is drawn through the nip 106, a fluid filament or filaments are formed and stretched between the two rollers 102 and 104. The fluid filament(s) exceed their capillary break-up point and break into a plurality of droplets. The droplets are directed towards a downstream side of the nip 106 and out of the device 100.

The doctor blade 116 can form a side of the fluid reservoir 114 and assist in constraining the feed fluid within the fluid reservoir 114. To further constrain the feed fluid to the fluid reservoir 114, the quantity of fluid within the reservoir does not exceed the height of the doctor blade 116. The amount of feed fluid within the reservoir 114 can vary, either as a starting amount or as the fluid is atomized. In instances, a minimal amount of fluid may be contained within the reservoir 114, the amount being sufficient to adequately coat the rollers 104.

Alternatively, a feed fluid distribution element can be included within the device, the distribution element configured to dispense feed fluid onto the roller 104. The feed fluid can be dispensed, at multiple locations or at a singular location, across the surface of the roller 104 at an upstream side of the doctor blade 116. The doctor blade 116 engages the feed fluid on the surface of the roller 104, distributing the feed fluid evenly across the surface of the roller 104.

The feed fluid within the reservoir 114 can be heated, either by heating the fluid itself or heating the interior of the housing 114 or device 100.

Alternatively, the feed fluid can be continuously introduced into the atomization device 100 from an external source. The feed fluid can be introduced into the feed fluid reservoir 114 directly or can be dispensed onto the roller 104 surface by a feed fluid distribution element. Alternatively, the fluid can be introduced into the atomization device 100 at regular intervals or a sensor can be included in the device that triggers the flow of fluid into the device 100. The introduced fluid can be of a certain pre-selected temperature that is optimal for formation of droplets having pre-selected and desired parameters.

The baffle unit 200 assists in directing the formed droplets in a desired direction and preventing overspray of the atomized fluid. The baffle unit 200 can be oriented in a desired direction to guide the formed droplets in a similar direction.

The baffle unit 200 extends through the housing 110 and some distance beyond. Formed droplets following a trajectory that is not substantially the same as that of the orientation of the baffle unit 200 are likely to encounter a surface of the baffle unit 200. In doing so, overspray is prevented as the formed droplets are guided in a desired direction. Lengthening or extending the baffle unit further increases the accuracy of the droplet direction. Formed droplets having a trajectory slightly deviating from the orientation of the baffle unit 200 may not encounter a surface of a shorter baffle unit 200 but are more likely to do so if the baffle unit 200 is lengthened or extended.

The formed droplets contacting a surface of the baffle unit 200 can be recycled into the interior of the device 100. Droplets, having contacted a surface of the baffle unit 200, are directed along the surface of the baffle unit 200 back into the interior of the device 100. The baffle surfaces can include a coating to further assist in the movement of the droplets along the surface.

The baffle unit includes external baffles 210 and 220, which form the interior periphery of the baffle unit 200. Droplets contacting one of the external baffles 210 or 220 are directed along the surface of the external baffle, eventually encountering vents 212 or 222 disposed within the external baffles 210 and 220, respectively. The fluid droplets flow through the vents 212 and 222 to an opposite surface of the external baffles 210 and 220. The droplets continue along the surface, eventually being deposited onto a roller 102 and 104, where they are recycled through the interior of the device 100.

Fluid droplets encountering the internal baffle 230 follow a similar recycling process as described above. The droplets travel across external surfaces of the internal baffle 230 and through the vents 232 to an interior surface of the internal baffle 230. The droplets are then directed into the nip 106 of the device 100 where the droplets are recycled into the interior of the device 100. The recycled droplets can be directed towards the nip 106 passively by gravity, or can be propelled towards the nip 106 by the baffle fluid flowing through the internal baffle 230.

FIGS. 6-8 show another example embodiment of an atomization device in which the direction of the expelled droplets is oriented in a horizontal plane. The various components of the previous embodiment, as shown in FIGS. 1 and 2, remain the same, with the baffle unit 400 having a different configuration. In the embodiment shown, the housing enclosing the rollers 302 and 304 and other components are not shown. It will be understood that the components described above in regards to the previous embodiment can be included in this example embodiment having a horizontal orientation.

As with the previous embodiment, the baffle unit 400 directs the flow of the droplets in a desired direction and assists in minimizing overspray and/or contamination of the surrounding environment with the droplet fluid. The baffle unit 400 includes upper and lower baffles, 410 and 420, and an internal baffle 430. The internal baffle 430 directs a baffle fluid through a baffle channel 444 towards the nip 306, defined between the rollers, 302 and 304. The directed baffle fluid assisting with the break-up of the fluid filaments and expulsion of the formed droplets from the atomization device. The internal baffle includes a baffle fluid inlet that is in fluid communication with a baffle fluid source that can be external to the atomization device.

As with the previous embodiment, the baffle unit 400 assists with directing the formed droplets in a desired direction and minimizing overspray or misdirected fluid droplets. The upper baffle 410 and the lower baffle 420 collect and gather errant droplets and recycle the fluid into the atomization device for future use. As described above, the fluid contacting surfaces of the baffle 400 can be coated, treated or finished to promote the travel of the fluid across the surface.

In the embodiment shown, the upper baffle 410 includes an integrated doctor blade 412 and a fluid reservoir 414. The upper roller 304 is not coated with fluid in this embodiment. Rather, it is the lower roller 302 that is initially coated with the feed fluid. The integrated doctor blade 412 removes fluid from the upper roller 304 after the droplet formation process. The removed fluid is directed into the fluid reservoir 414 where it can flow to the lower baffle 420 through a shunt 450. The shunt 450 allows fluid communication between the upper and lower baffles 410 and 420. The fluid collected in the reservoir 414 of the upper baffle 410 flows through the shunt 450 into the fluid reservoir 424 of the lower baffle 420. Fluid droplets collected on the surface of the upper baffle 420 flow along the inclined surface of the upper baffle and can be deposited onto the upper roller 304 or deposited onto the surface of the inner baffle 430.

The lower baffle 420 includes vents 422 and a fluid reservoir 424. Droplets collected by the lower baffle 420 flow along the inclined surface of the baffle towards the upstream side of the nip 306. The collected fluid flows through the vents and into the reservoir 424. The fluid collected within the fluid reservoir 424 is directed onto the surface of the lower roller 302 where it can be recycled for additional filament extension and atomization processes.

Droplets collected on the internal baffle 430 are directed along the inclined profiles of the internal baffle 430. Droplets collected on an upper profile of the internal baffle 430 are directed along the inclined profile of the internal baffle 430 towards the nip 306. The collected droplets are then directed towards the nip 306 by the flow of baffle fluid through the channel 444. Droplets collected on the lower profile of the internal baffle 430 are directed along the inclined lower surface towards a protrusion 445. The collected droplets coalesce at the protrusion 445 and eventually fall through the vents 422 of the lower baffle 420. There, the fluid is collected in the fluid reservoir 424 and recycled back into the atomization device as described above.

To achieve the desired droplet parameters, namely size, many aspects of the atomization device can be varied. The variable aspects include the spacing between the pair of rollers, the pressure exerted between the rollers at the nip, the speed and direction of the rotation of the rollers, the spacing of doctor blade(s) from the surface of one or more of the rollers, various baffle fluid characteristics, the temperature of the feed fluid and internal components of the atomization device and the physical geometry of the baffle and atomization device housing.

A control system can be integrated or used in conjunction with the atomization device to control the formation of the droplets. The control system can monitor or sense characteristics, such as size, direction and/or velocity, of the droplets expelled from the atomization device and in response to the sensed characteristics, vary at least an aspect or characteristic, such as those listed above, of the atomization device to correct at least a characteristic of the plurality of expelled droplets. Alternatively, adjustments to the aspects or characteristics of the atomization device can be performed manually by a user in response to observed droplet characteristics.

FIGS. 9-12 show another example baffle unit 600. The baffle unit 600 includes a baffle opening 604, external baffles 610 and 620, an internal baffle 630 and a pair of baffle fluid inlets 640. Rather than directing the baffle fluid through the internal baffle 630, in this example, the baffle fluid is introduced into the baffle unit 600 through a pair of diametrically opposed baffle fluid inlets 640. The baffle fluid inlets 640 are positioned on the sides of baffle unit near the rollers, 502 and 504, such that the stream of baffle fluid through the inlet is directed parallel to the rollers. The baffle fluid streams are aligned with the downstream side of the nip 506 and positioned some distance away from the nip 506. The baffle unit 600 can be used with the atomization device in any orientation.

The baffle fluid is introduced through the pair of baffle fluid inlets 640 into the baffle unit 600 from an external baffle fluid source. As with the previously discussed examples, the baffle fluid can be heated, the heated baffle fluid assisting in heating the interior of the atomization device.

Figure 12:
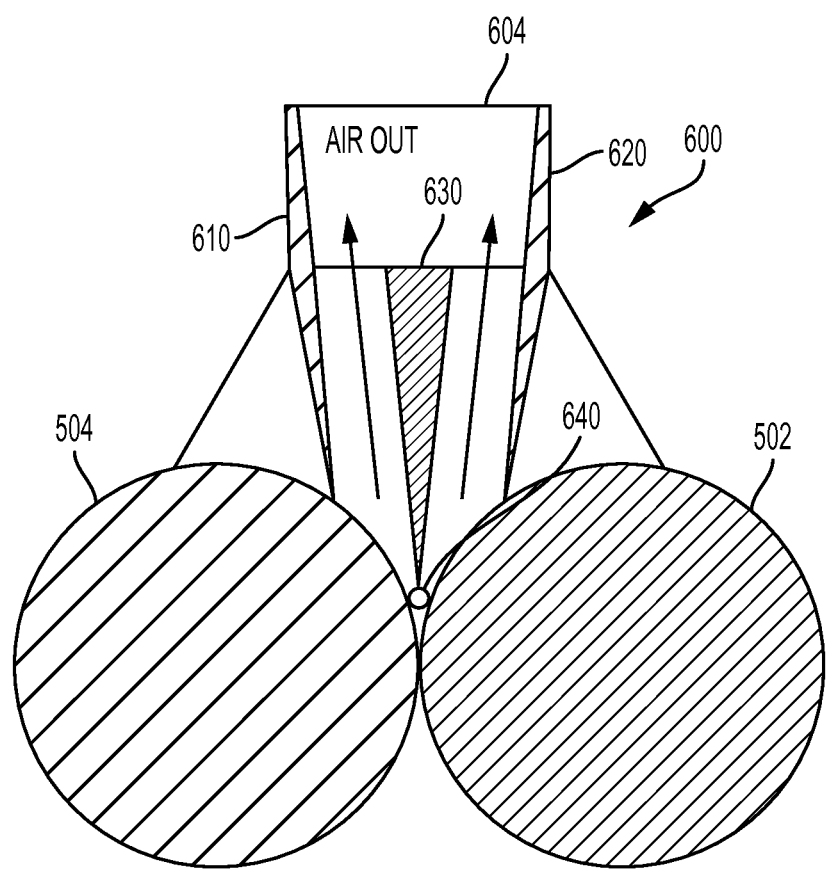
FIG. 12 is a cross section of the example baffle unit of FIG. 9, indicating the airflow through the baffle unit.

The baffle fluid is introduced within the baffle 600 through the pair of baffle fluid inlets 640. The two streams of baffle fluid are directed towards the center of the baffle unit 600 and are parallel to the rollers 502 and 504 along the downstream side of the nip. At approximately mid-line of the rollers 502 and 504, the pair of baffle fluid streams meet, which causes the baffle fluid streams to disperse. Due to the structure of the baffle unit 600 and the counter-rotation of the rollers, 502 and 504, the baffle fluid is directed downstream and out towards the baffle opening 604, as shown in FIG. 12. The flow of the baffle fluid outward from the device entraps the droplets as described above, transporting the droplets out through the baffle opening 604 in a desired direction.

Unlike the previously described examples, the baffle fluid of the baffle unit 600 is not directed towards the nip 506. Instead the baffle fluid flows parallel to the nip from opposing sides of the baffle unit 600. The two opposing streams of the baffle fluid collide, dispersing the streams and generating a net flow of the baffle fluid through the baffle outlet 604 of the baffle unit 600. The flow of the baffle fluid streams above the nip 506 can interact with the fluid filaments stretched between the rollers 502 and 504. The shear force exerted on the fluid filaments by the flow of the baffle fluid parallel to the nip further strains the fluid filaments, assisting with the break-up of the fluid filaments. Alternatively, the baffle fluid streams can be directed along the plane in which the fluid filaments are stretched, such that the flow of the baffle fluid directly contacts the fluid filament from a side-on direction, rather than a head-on direction as described in the previous examples.

As described above, one or more parameters of the baffle fluid, such as the medium, flow rate and pressure, can be adjusted to select for droplets having desired physical parameters, such as size. Additionally, the geometry of the baffle unit 600, such as the height of the baffle unit 600, can be varied to assist with selection of droplets having the desired pre-selected physical parameters.

As with the previously described example baffle units, the baffle unit 600 can recycle collected droplets back into the atomization device for use in further deposition processes. Collected droplets can include droplets that do not meet desired pre-selected parameters, such as those having an undesired trajectory or size. The droplets collected on the external baffles 610 and 620 are directed along the inclined profile of the external baffles. The collected fluid is then deposited onto one of the rollers 502, 504 to be recycled back into the atomization device.

The internal baffle 630, as shown in FIGS. 9-12, is a solid, wedge-shaped piece, with the apex of the wedge directed towards the nip 506 and set a distance therefrom. Alternatively, the internal baffle 630 can be a hollow element or composed of two intersecting planes that terminate at the intersection point. Droplets collected on the internal baffle 630 are directed along the inclined profile of the internal baffle. The collected fluid is then deposited onto the nip 506 or is carried back through the baffle unit 600 by the flow of the baffle fluid through the baffle unit.

Alternatively, the external and internal baffles of the baffle unit 600 can include similar recycling elements as described in the previous exemplary baffle units.

Figure 13:
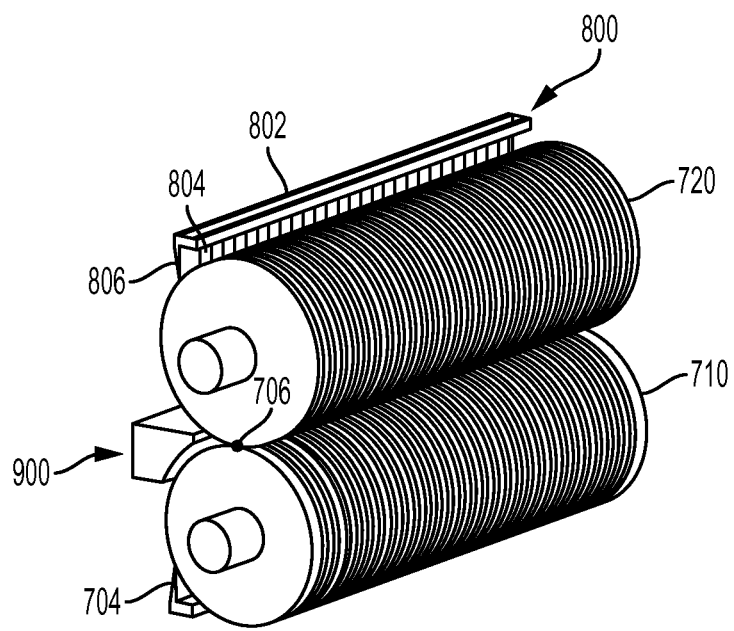
FIG. 13 is a perspective view of an embodiment of a pair of rollers and associated components of an example atomization device.
Figure 14:
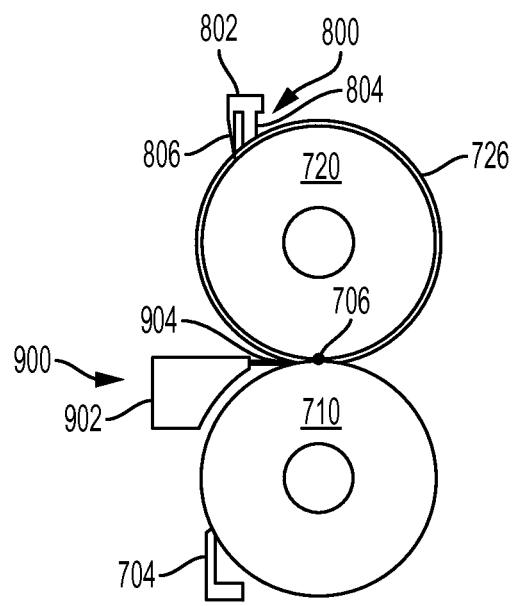
FIG. 14 is a side view of the rollers and associated components of FIG. 13.

FIGS. 13 and 14 illustrate an example embodiment of an alternative roller design and feed fluid delivery and including an air system. A pair of rollers 710, 720 have a plurality of grooves and/or channels disposed across the surface of the rollers. The intervening surfaces of the rollers mate, as with the previously described embodiments, and form a plurality of nips 706. A nip is formed at each mating surface of the rollers 710 and 720. As described above, the plurality of nips have a downstream side and an upstream side. A feed fluid delivery system 800 is positioned above and dispenses feed fluid onto the roller 720. An air source 900 is positioned proximate and between the rollers 710 and 720. The air source directs a quantity of air between the rollers 710 and 720. The air is directed from the upstream side of the nip towards the downstream side of the nip. The directed air assists in transporting and guiding the formed droplets from the atomization device in a desired direction.

Figure 15:
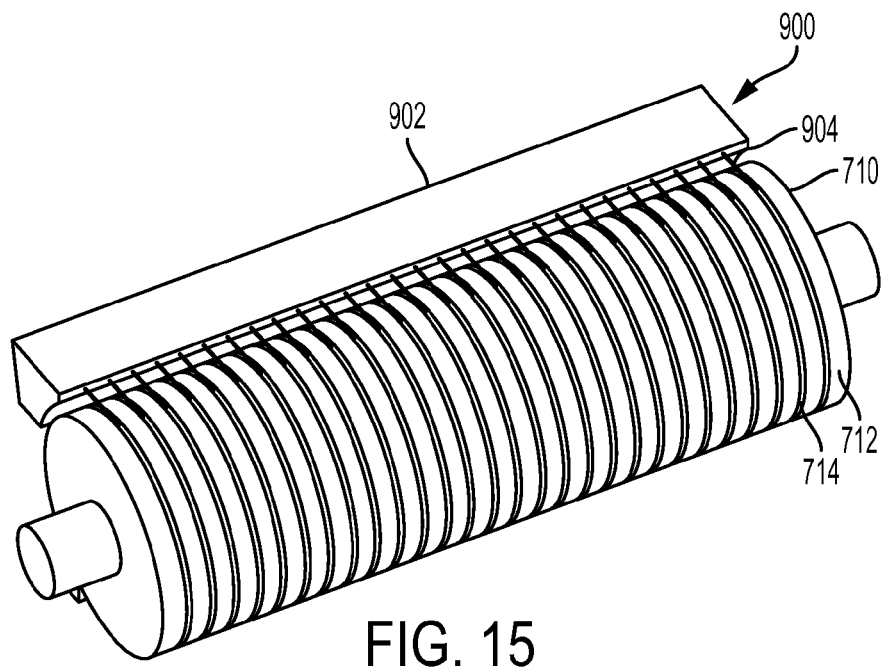
FIG. 15 is a perspective view of a roller and air tubes of FIG. 13.

FIG. 15 is a more detailed view of the roller 710 and the air source 900. The roller 710 has a plurality of surfaces 712 that each mate with like surfaces of the roller 720 to form the plurality of nips 706. Each of the surfaces 712 forming a nip with the like surface of the roller 720. A plurality of channels 714 is also disposed along the length of the roller 710. The channels 714 and surfaces 712 alternate across the roller 710. Air tubes 904 of the air source 900 are positioned within the channels 710. The air tubes deliver the quantity of air from the air source 900 directed towards the downstream side of the nip 706. The directed air assists in moving and guiding the formed droplets from the atomization device.

The air source 900 includes the air tube 904 and an air delivery rail or manifold 902. Air, or alternatively another fluid, is fed into the delivery rail or manifold 902 from an external or internal source. The manifold 902 directs a quantity of the air into each of the air tubes 904, the air expelled from the air tubes 904 towards the downstream side of the plurality of the nips 706. The manifold 902 ensures that the air expelled from each of the air tubes 904 has substantially similar properties, such as speed, pressure and quantity. The air source 900 can be integrated or mounted within the housing of the atomization device. In the case where the air is delivered from an external source, the air source 900 is in fluid communication with the external source.

Figure 16:
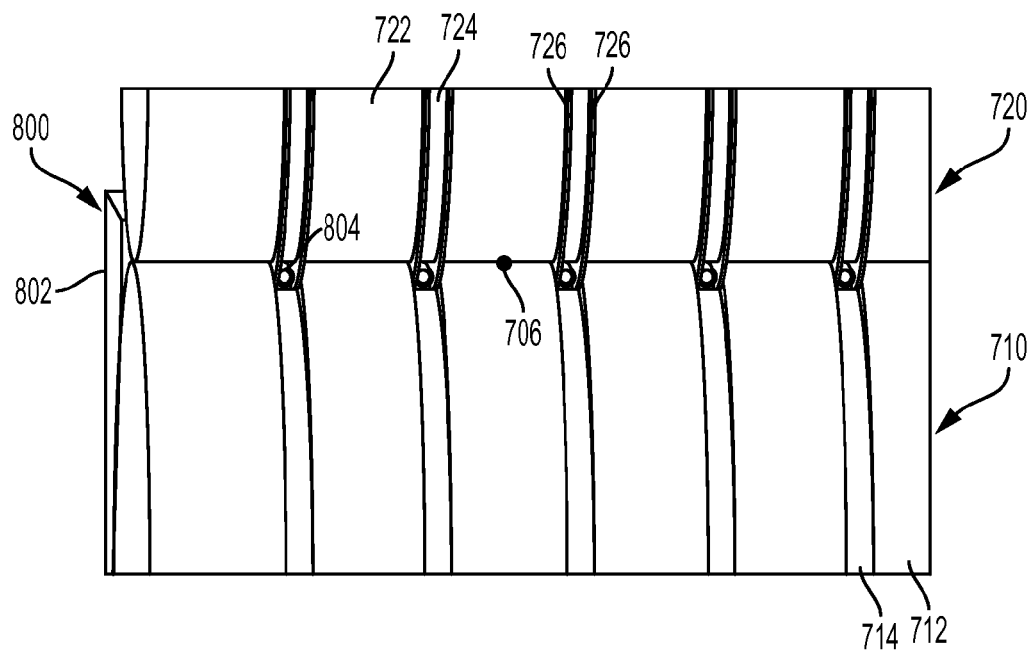
FIG. 16 is a front view showing the mating of the rollers and the air tubes of FIG. 13.

FIG. 16 shows a detailed view of the mating of the rollers 710 and 720 and the air tubes 904 disposed between. The roller 720 includes surfaces 722 that mate with the surfaces 712 of the roller 710 to form the nips 706 from which the feed fluid is stretched to form the fluid filaments. Channels 724 are also disposed along the surface of the rollers. Unlike the channels 714 of the roller 710, the channels 724 of roller 720 include fins 726 disposed on either side of the channel 724. The channels 714, 724 are aligned as the rollers 710, 620 counter-rotate. The fins 726 extend into the channel 714 of the roller 710, forming an enclosed space between the rollers 710, 720 in which the air tubes 904 of the air source 900 can be disposed. The enclosed nature of the space prevents the feed fluid from contaminating the space and potentially occluding the air tube 904.

Figure 17:
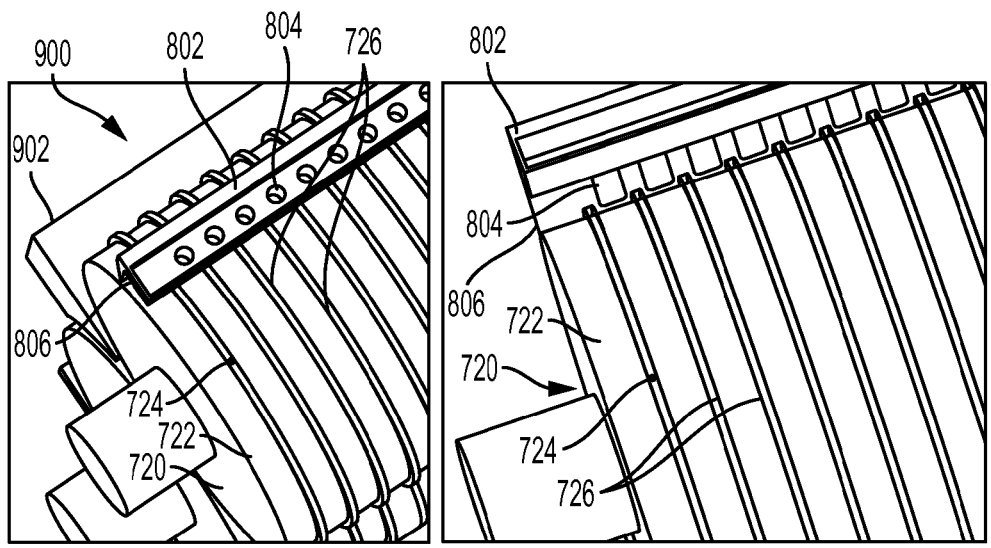
FIG. 17 is a perspective view of a portion of the rollers and associated components of FIG. 13.

FIG. 17 shows two perspective views of the roller 720 and the feed fluid delivery system 800. Feed fluid is deposited onto the surfaces 722 of the roller 720 by the feed fluid delivery system 800. The feed fluid delivery system 800 includes a feed fluid delivery rail 802, feed fluid delivery tubes 804 and an integrated doctor blade 806. The feed fluid is introduced into the feed fluid delivery rail 802 from an external feed fluid source. The feed fluid travels along the delivery rail 802, down the feed fluid delivery tubes 804 and onto the surfaces 722 of the roller 720. The doctor blade 806 distributes the fluid evenly across each of the surfaces 722 at a desired and pre-selected fluid thickness. In the embodiment shown, the feed fluid delivery rail 802 is a simple channel into which the feed fluid is fed.

In an alternative embodiment, the delivery rail 802 can function as a manifold, delivering a pre-selected amount of feed fluid to each of the feed fluid delivery tubes 804. The feed fluid delivery rail 802 can also be heated to heat or warm the feed fluid as necessary to achieve the desired droplet properties.

Figure 18:
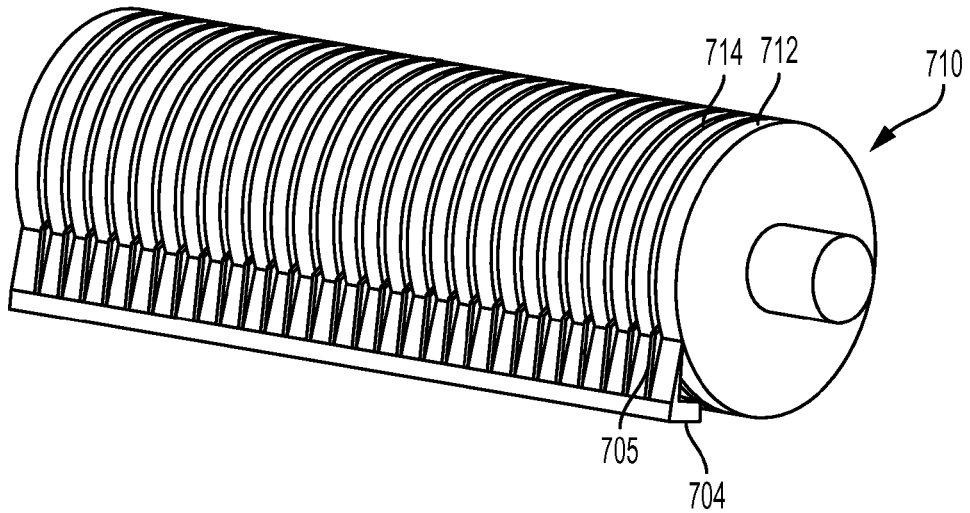
FIG. 18 is a perspective view of a doctor blade and a roller of FIG. 13.

FIG. 18 shows the roller 710 and the doctor blade 704 that cleans excess fluid from the roller 710. The doctor blade 604 includes protrusions 705 that clean excess fluid from within the channels 714 of the roller 710.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An atomization device, comprising:
 a pair of rotating rollers positioned adjacent to each other and defining a nip therebetween, the nip having an upstream side and a downstream side;
 a fluid source configured to coat at least one of the rollers with a feed fluid; and
 a baffle unit having a pair of exterior baffles and an interior baffle positioned between the exterior baffles, the interior baffle configured to direct a baffle fluid towards the downstream side of the nip and the exterior baffles configured to receive a suspension that includes at least a portion of the baffle fluid and fluid droplets formed from stretching the feed fluid on the downstream side of the nip between diverging surfaces of the pair of rollers.

2. The atomization device of claim 1, further comprising a housing including side walls and an exit port, the pair of rotating rollers, the fluid source and the baffle unit are disposed in the housing, the baffle unit further configured to interface with the housing and exit port.

3. The atomization device of claim 2, wherein the side walls of the housing are insulative.

4. The atomization device of claim 1, further comprising a heat source configured to heat at least one of an interior of the housing, the pair of rotating rollers, the fluid source, the feed fluid, the baffle fluid and the baffle unit.

5. The atomization device of claim 1, wherein at least one of the pair of exterior baffles are configured to collect at least a portion of the fluid droplets in the suspension.

6. The atomization device of claim 5, wherein the at least one of the pair of exterior baffles includes vents disposed therein, the vents configured to receive a portion of the collected suspension and direct the received portion of the collected suspension to coat at least one of the pair of rotating rollers.

7. The atomization device of claim 1, wherein the interior baffle is configured to collect at least a portion of the fluid droplets in the suspension.

8. The atomization device of claim 1, wherein the exterior surface of the interior baffle includes vents disposed therein, the vents configured to receive a portion of the suspension and direct the received portion of the collected suspension towards the upstream side of the nip.

9. The atomization device of claim 1, wherein the baffle unit surfaces are coated with a coating, the coating configured to promote travel of the suspension along a baffle unit surface.

10. The atomization device of claim 1, wherein the interior baffle has an inlet port configured to receive the baffle fluid.

11. The atomization device of claim 1, wherein the pair of rotating rollers are positioned substantially horizontal and side-by-side, the baffle unit aligned with the pair of rotating rollers in a substantially vertical plane extending away from the downstream side of the nip.

12. The atomization device of claim 1, wherein the pair of rotating rollers are configured to counter-rotate.

13. The atomization device of claim 1, wherein each roller has a centerline, the centerlines of the rollers spaced a roller spacing distance from each other.

14. The atomization device of claim 1, further comprising a doctor blade positioned adjacent to and a doctor blade spacing distance from a surface of a roller.

15. The atomization device of claim 1, wherein the pair of rotating rollers are positioned substantially horizontal and are stacked, the baffle unit aligned with the pair of rotating rollers in a substantially horizontal plane extending away from the downstream side of the nip.

16. The atomization device of claim 15, wherein the pair of exterior baffles includes a lower and an upper exterior baffle, the lower exterior, upper exterior and interior baffles configured to direct the received suspension towards at least one of the rollers and the nip.

17. The atomization device of claim 15, wherein the pair of exterior baffles includes a lower and a upper exterior baffle, the lower exterior baffle having vents disposed therein, the upper and lower exterior baffles configured to be in fluid communication with each other.

18. The atomization device of claim 17, wherein the interior baffle features a protrusion on a lower surface, the protrusion aligned with the vents of the lower exterior baffle.

19. An atomization device, comprising: a pair of rotating rollers having a pair of diverging surfaces positioned adjacent to each other and defining a nip therebetween, the nip having an upstream side and a downstream side; a fluid source configured to coat at least one of the diverging surfaces with a fluid; and a baffle unit having a pair of exterior baffles and an interior baffle positioned between the exterior baffles, the interior baffle configured to direct air towards the downstream side of the nip and the exterior baffles configured to receive a suspension of at least a portion of the air and fluid droplets formed from stretching the fluid on the downstream side of the nip between the diverging surfaces.

20. A method of atomizing a feed fluid, comprising:
 drawing the feed fluid from a fluid source through a nip defined between a pair of rotating rollers, the nip having an upstream side and a downstream side;
 stretching the feed fluid between the diverging surfaces of the pair of rotating rollers on the downstream side of the nip to form a fluid filament;
 expelling at least a portion of a baffle fluid from an interior baffle of a baffle unit positioned adjacent to the downstream side of the nip; and
 suspending a plurality of feed fluid droplets within at least a portion of the baffle fluid, the plurality of feed fluid droplets formed from the stretched feed fluid filament on the downstream side of the nip between the diverging surfaces of the pair of rotating rollers.

21. The method of atomizing a fluid of claim 20, further including heating one or both of the feed fluid and the baffle fluid.

22. The method of atomizing a fluid of claim 20, further including collecting at least a portion of the suspension of the baffle fluid and the plurality of feed fluid droplets on at least a surface of the baffle unit.

23. The method of atomizing a fluid of claim 20, further including sensing at least a physical characteristic of the plurality of atomization fluid droplets and altering at least one of the stretching, expelling or suspending steps in response to the sensed physical characteristic.

* * * * *